(12) United States Patent
Yoo et al.

(10) Patent No.: US 11,041,987 B2
(45) Date of Patent: Jun. 22, 2021

(54) BACKLIGHT UNIT WITH GAP-RETAINING MEMBER AND DISPLAY DEVICE COMPRISING SAME

(71) Applicant: SAMSUNG ELECTRONICS CO., LTD., Suwon-si (KR)

(72) Inventors: Yong-sung Yoo, Suwon-si (KR); Dae-young Kim, Suwon-si (KR); Hyung-ki Kim, Anyang-si (KR); Kil-hong Lee, Suwon-si (KR); Duk-jin Jeon, Bucheon-si (KR); Tae-hee Jeon, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/769,740

(22) PCT Filed: Aug. 22, 2018

(86) PCT No.: PCT/KR2018/009633
§ 371 (c)(1),
(2) Date: Jun. 4, 2020

(87) PCT Pub. No.: WO2019/139211
PCT Pub. Date: Jul. 18, 2019

(65) Prior Publication Data
US 2020/0387033 A1      Dec. 10, 2020

(30) Foreign Application Priority Data
Jan. 9, 2018   (KR) .......................... 10-2018-0002644

(51) Int. Cl.
*G02F 1/13357*      (2006.01)
*F21V 8/00*         (2006.01)

(52) U.S. Cl.
CPC ......... *G02B 6/0091* (2013.01); *G02B 6/0066* (2013.01); *G02B 6/0083* (2013.01); *G02F 1/133608* (2013.01)

(58) Field of Classification Search
CPC .. G02B 6/0066; G02B 6/0083; G02B 6/0091; G02F 1/133608
See application file for complete search history.

(56) References Cited

U.S. PATENT DOCUMENTS 7,976,183 B2 * 7/2011 Park .................. G02F 1/133608
                                                          362/221
8,947,617 B2   2/2015 Jung et al.
(Continued)

FOREIGN PATENT DOCUMENTS

EP    3 144 722 A1   3/2017
JP    4143920 B2     9/2008
(Continued)

OTHER PUBLICATIONS

International Search Report dated Nov. 14, 2018 issued by the International Searching Authority in counterpart International Application No. PCT/KR2018/009633 (PCT/ISA/210).
(Continued)

*Primary Examiner* — Evan P Dzierzynski
*Assistant Examiner* — Keith G. Delahoussaye
(74) *Attorney, Agent, or Firm* — Sughrue Mion, PLLC

(57) ABSTRACT

Disclosed is a backlight unit. The disclosed backlight unit comprises: a light guide plate; and a light source module configured to emit light to a light incident surface formed on at least one side of the light guide plate, wherein the light source module comprises: a printed circuit board; and a connector connected to multiple light sources arranged on the printed circuit board and to the printed circuit board, so as to transfer electric power thereto, and the connector may
(Continued)

comprise a gap-retaining member arranged between the printed circuit board and the light guide plate, so that the light sources and the light incident surface are spaced apart from each other by a predetermined optical distance.

15 Claims, 11 Drawing Sheets

(56) References Cited

U.S. PATENT DOCUMENTS

| | | | |
|---|---|---|---|
| 9,488,773 B2 | 11/2016 | Hong et al. | |
| 9,529,143 B2 | 12/2016 | Lee et al. | |
| 9,664,842 B2 | 5/2017 | Kim et al. | |
| 10,551,555 B2 * | 2/2020 | Park | G02B 6/0083 |
| 2010/0302804 A1 * | 12/2010 | Inagaki | B60Q 3/74 |
| | | | 362/606 |
| 2012/0281151 A1 * | 11/2012 | Abe | G02B 6/0091 |
| | | | 348/739 |
| 2013/0094241 A1 * | 4/2013 | Yu | G02B 6/0091 |
| | | | 362/602 |
| 2014/0098322 A1 * | 4/2014 | Tokuyama | G02F 1/133608 |
| | | | 349/58 |
| 2014/0218618 A1 | 8/2014 | Sasaoka et al. | |
| 2015/0153506 A1 * | 6/2015 | Dunn | G02B 6/0091 |
| | | | 362/612 |
| 2016/0124141 A1 * | 5/2016 | Na | G02B 6/0088 |
| | | | 362/613 |
| 2017/0003441 A1 * | 1/2017 | Choi | G02B 6/0091 |

FOREIGN PATENT DOCUMENTS

| | | | |
|---|---|---|---|
| JP | 2014-153438 A | 8/2014 |
| KR | 10-0966874 B1 | 6/2010 |
| KR | 10-2011-0041967 A | 4/2011 |
| KR | 10-2013-0044463 A | 5/2013 |
| KR | 10-2014-0092125 A | 7/2014 |
| KR | 10-2015-0111024 A | 10/2015 |
| KR | 10-2016-0028571 A | 3/2016 |
| KR | 10-2016-0053440 A | 5/2016 |
| KR | 10-2016-0141085 A | 12/2016 |
| WO | 2012/111549 A1 | 8/2012 |

OTHER PUBLICATIONS

Written Opinion dated Nov. 14, 2018 issued by the International Searching Authority in counterpart International Application No. PCT/KR2018/009633 (PCT/ISA/237).
Communication dated Oct. 23, 2020, issued by the European Patent Office in counterpart European Application No. 18899157.4.

* cited by examiner

BACKLIGHT UNIT WITH GAP-RETAINING MEMBER AND DISPLAY DEVICE COMPRISING SAME

TECHNICAL FIELD

The disclosure relates to a backlight unit and a display device including the same.

BACKGROUND ART

A display device for displaying an image is used in various devices such as televisions, computer monitors, smartphones, and the like as a device for displaying an image using a display panel. However, a separate backlight unit including a light source is necessary since the typical display device may not emit light itself, and such a backlight unit is arranged on the back of the display panel.

The backlight unit included in the display device includes a light source, and a light guide plate for diffusing light output from the light source in a direction of the display panel.

A predetermined optical distance should be maintained between the light source and the light guide plate so that light of the light source is uniformly emitted to the light guide plate, thereby preventing a phenomenon of generation of a dark area at a part of the light guide plate (light leakage).

In order for this, conventionally, the light guide plate was supported by forming a constant protrusion on a bottom chassis supporting the display device from the back, thereby maintaining a predetermined optical distance between the light guide plate and the light source.

DISCLOSURE

Technical Problem

However, in such a structure, an error in the optical distance between the light source and the light guide plate occurs depending on a state of a flatness of the bottom chassis, thereby occurring a problem such as light leakage.

Technical Solution

An object of the disclosure is to provide a backlight unit including a connector including a gap-retaining member that is able to retain a predetermined optical distance between a light source and a light guide plate, and a display device including this.

In order to achieve the afore-mentioned object, there is provided a backlight unit including a light guide plate; and a light source module configured to emit light to a light incident surface formed on at least one surface of the light guide plate, in which the light source module includes a printed circuit board, a plurality of light sources arranged on the printed circuit board, and a connector connected to the printed circuit board to transfer electric power, and the connector includes a gap-retaining member arranged between the printed circuit board and the light guide plate so that the light source and the light incident surface are spaced apart from each other by a predetermined optical distance.

The gap-retaining member may be arranged to be closer to the light incident surface rather than the light source.

The gap-retaining member may come into contact with the light incident surface.

The plurality of light sources may be arranged along a length direction of the printed circuit board, and the gap-retaining member may be arranged between the plurality of light sources.

The connector may include a connector main body combined with the printed circuit board, and the gap-retaining member may be protruded from one surface of the connector main body.

The gap-retaining member may be protruded from the one surface of the connector main body between the printed circuit board and the light incident surface.

The printed circuit board may be arranged to face the light incident surface, and the connector main body may be arranged at the back of the light guide plate.

The printed circuit board may include a combination part that is protruded towards the back of the light guide plate and combined with the connector main body.

The connector main body may be arranged at the center of the printed circuit board in a length direction.

The connector may include a plurality of the gap-retaining members.

The connector main body and the gap-retaining member may be integrally formed by injection molding.

The light incident surface may be arranged at a lower surface of the light guide plate, and the gap-retaining member may support the light guide plate.

The light source module may be composed of a plurality of light source modules and may include a first light source module and a second light source modules arranged along a length direction of the light incident surface, and the first and second light source modules may include first and second gap-retaining members supporting the light guide plate, respectively.

The light guide plate may include a first light incident surface formed on one surface of the light guide plate and a second light incident surface arranged on the other surface opposite to the one surface, the light source module may be composed of a plurality of light source modules and may include a third light source module emitting light to the first incident surface and a fourth light source modules emitting light to the second light incident surface, and the third and fourth light source modules may include third and fourth gap-retaining members coming into contact with the light guide plate, respectively.

In addition, in order to achieve the afore-mentioned object, there is provided a display device including a display panel, and a backlight unit providing light to the display panel, in which the backlight unit includes a light guide plate, and a light source module configure to emit to a light incident surface formed on at least one surface of the light guide plate, the light source module includes a printed circuit board, a plurality of light sources arranged on the printed circuit board, and a connector connected to the printed circuit board to transfer electric power, and the connector includes a gap-retaining member arranged between the printed circuit board and the light guide plate so that the light source and the light incident surface are spaced apart from each other by a predetermined optical distance.

DETAILED DESCRIPTION OF EXEMPLARY EMBODIMENTS

In order to sufficiently understand configurations and effects of the disclosure, preferred embodiments of the disclosure will be described with reference to the accompanying drawings. The disclosure is not limited to the embodiments disclosed hereinafter and may be implemented in various forms and may be variously modified. The description regarding the embodiments is provided to complete the disclosure and let those skilled in the art completely know the scope of the disclosure. Elements in the accompanying drawings are shown enlarged from their actual sizes for convenience of description and a proportion of each element may be magnified or reduced.

The expressions "first," "second" and the like may be used for describing various elements, but the elements may not be limited by the expressions. The expressions may be used only to distinguish one element from another. For example, a first element may be referred to as a second element and the second element may also be similarly referred to as the first element, while not departing from the scope of a right of the disclosure.

The terms used in the embodiments of the disclosure may be interpreted as meanings usually known by those skilled in the art, unless otherwise defined.

Hereinafter, a structure of a display device 1 according to an embodiment of the disclosure will be described with reference to the drawings.

Figure 1:
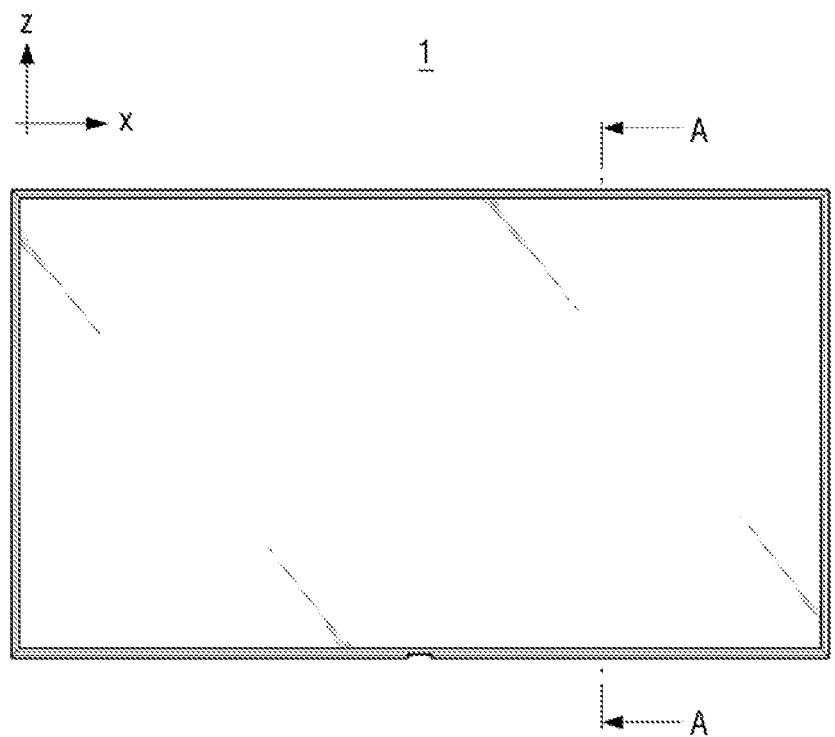
FIG. 1 is a front view showing a display device according to an embodiment.
Figure 2:
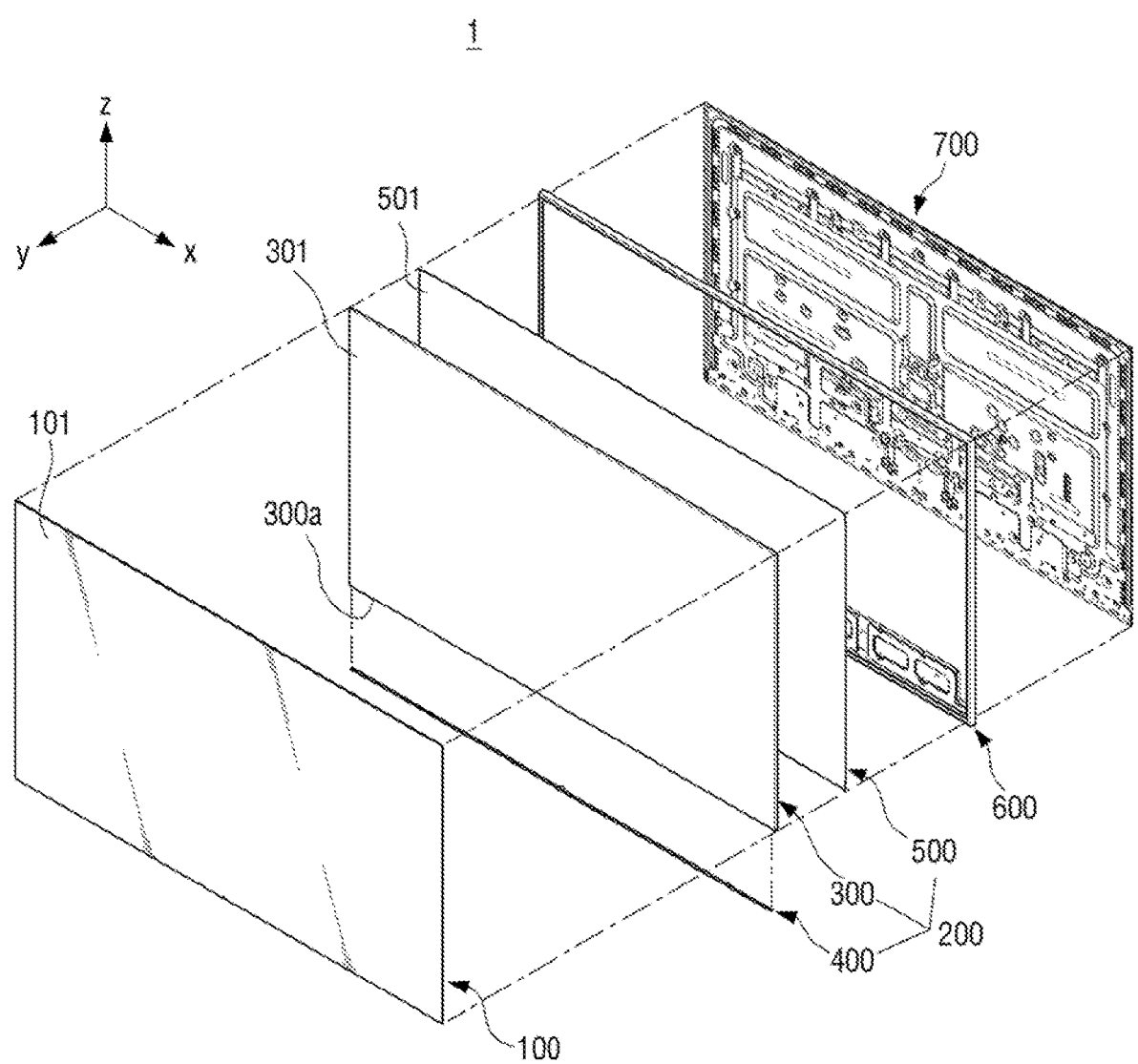
FIG. 2 is an exploded perspective view showing the display device according to an embodiment.
Figure 3:
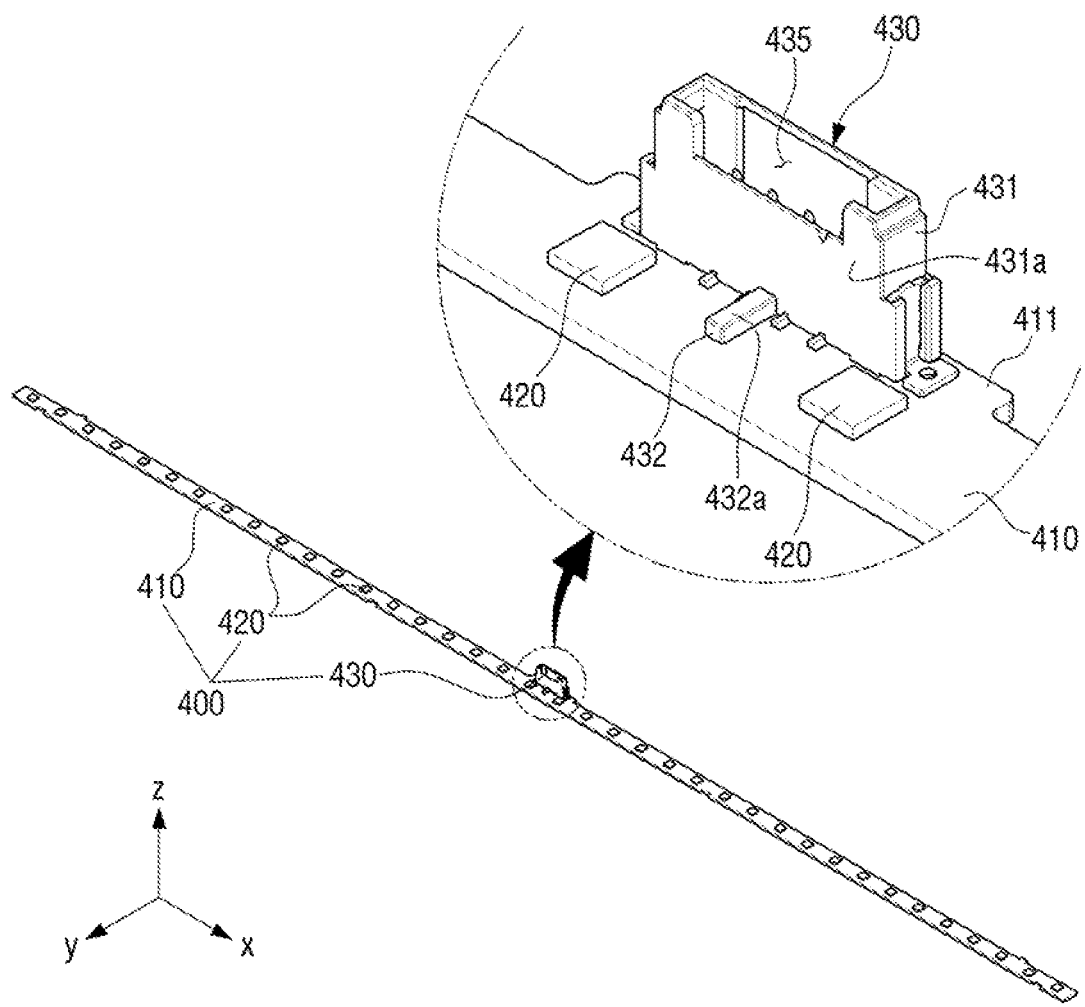
FIG. 3 is a perspective view and a partially enlarged view showing a combination between a printed circuit board and a connector of a light source module according to an embodiment.

FIG. 1 is a front view showing the display device 1 according to an embodiment of the disclosure, FIG. 2 is an exploded perspective view showing the display device 1 according to an embodiment of the disclosure, and FIG. 3 is a perspective view and a partially enlarged view showing a combination between a printed circuit board 410 and a connector 430 of a light source module 400 according to an embodiment of the disclosure.

As shown in FIGS. 1 to 3, the display device 1 includes a display panel 100 displaying an image, a backlight unit 200 providing light to the display panel 100, and a holder 600 and a bottom chassis 700 supporting the display panel 100 and fixing the backlight unit 200.

The display panel 100 may display various images on a front side (Y axis direction of FIG. 1) according to an image signal input from the outside and may be composed of a liquid crystal display (LCD) panel.

The backlight unit 200 may include a light guide plate 300, a light source module 400 emitting light to a light incident surface 300a formed on at least one surface of the light guide plate 300, and a reflect sheet 500.

The light guide plate 300 may guide light incident from the light source 420 (see FIG. 3) of the light source module 400 to the display panel 100, and emit the light towards the display panel 100 by converting light incident from the light source 420 into a surface light source having a uniform amount of light.

The light guide plate 300 may emit uniform light through a front surface (or light-exiting surface) 301 facing the display panel 100 by refracting, reflecting, and scattering of the light incident from the light source 420 inside.

It is possible to obtain uniform distribution of light emitted through the front surface 301 of the light guide plate 300 by forming a plurality of light-exiting patterns (not shown) on the front surface 301.

The light guide plate 300 may be formed of polymethyl methacrylate (PMMA), polycarbonate (PC), or the like.

The plate guide plate 300 may be arranged in contact with a front surface 501 of the reflective sheet 500. The light guide plate 300 and the reflective sheet 500 are fixed by the holder 600.

The reflective sheet 500 may be combined on a back surface of the light guide plate 300 as an element capable of reflecting light and may reflect light travelling from the inside of the light guide plate 300 towards the back surface of the light guide plate 300, to the inside of the light guide plate 300. The reflective sheet 500 may be formed of a polymer as a material capable of reflecting light.

The bottom chassis 700 is an element combined with the holder 600 and may fix the display panel 100, the light guide plate 300, the light source module 400, and the reflective sheet 500 together with the holder 600. In addition, if necessary, the bottom chassis 700 may fix the display device 1 at a certain position by fixing the display device 1 on a wall by using a separate fixing member (not shown).

Further, a reflective sheet (not shown), a prism sheet (not shown), a protective sheet (not shown), a brightness enhance film (double brightness enhance film (DBEF)) (not shown), or the like for diffusing or scattering light emitted from the light guide plate 300 may be additionally combined at the back of the display panel 100.

The prism sheet or the brightness enhance film may increase a brightness by refracting or collecting light diffused through a diffuser plate, and the protective sheet may protect the diffuser plate, the prism sheet, the brightness enhance film, and component parts arranged in the display device 1 from external impact or foreign materials.

Referring to FIG. 3, the light source module 400 may include the printed circuit board 410, the plurality of light sources 420 arranged on the printed circuit board 410, and the connector 430 connected to the printed circuit board 410 to transfer electric power.

The printed circuit board 410 has a shape having a length corresponding to a length of the light incident surface 300a of the light guide plate 300 and is arranged to face the light incident surface 300a. A circuit of the printed circuit board 410 is printed on a surface of the printed circuit board 410.

The plurality of light sources 420 are arranged on the printed circuit board 410 at regular intervals along a length direction of the printed circuit board 410.

Figure 6:
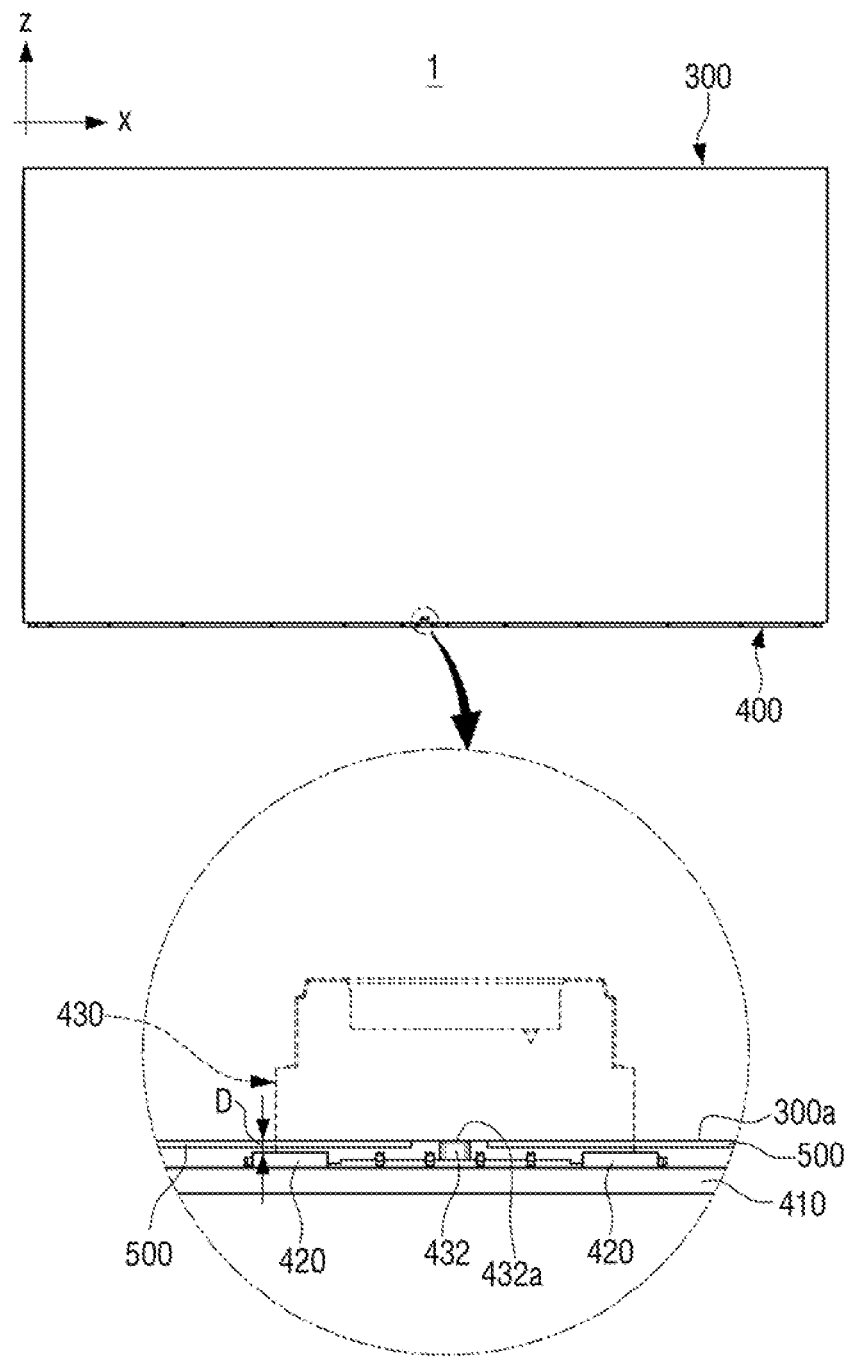
FIG. 6 is a front view showing a light guide plate and a light source module according to an embodiment.

The connector 430 includes a connector main body 431 combined with the printed circuit board 410, and a gap-retaining member 432 arranged between the printed circuit board 410 and the light guide plate 300 so that the light sources 420 and the light incident surface 300a of the light guide plate 300 are spaced apart from each other by a predetermined optical distance D (see FIG. 6).

The printed circuit board 410 includes a combination part 411 protruded backwards of the light guide plate 300 (direction opposite to the Y axis direction of FIG. 1) and combined with the connector main body 431. Accordingly, when the printed circuit board 410 is arranged to face the light incident surface 300a of the light guide plate 300, the connector main body 431 is arranged at the back of the light guide plate 300 (direction opposite to the Y axis direction of FIG. 1). The connector main body 431 does not interfere with a path of the flat light source emitted to the display panel 100 through the front surface (or light-exiting surface) 301 of the light guide plate 300, since the connector main body 431 is arranged at the back of the light guide plate 300. In addition, as a result, the connector main body 431 does not interfere with the plurality of light sources 420 arranged on the printed circuit board 410.

The connector main body 431 may be arranged at the center of the printed circuit board 410 in the length direction. Accordingly, the gap-retaining member 432 connected to the connector main body 431 may be arranged at the center of the light incident surface 300a to stably support the light guide plate 300, and the predetermined optical distance D between the light guide plate 300 and the light sources 420 may be stably retained.

The connector main body 431 includes a cable insertion hole 435 to which a cable connected to an external power supply (not shown) or a controller (not shown) is inserted. The cable insertion hole 435 may electrically connect the cable and the printed circuit board 410.

The gap-retaining member 432 is formed to be protruded from one surface 431a of the connector main body 431 between the printed circuit board 410 and the light incident surface 300a. The gap-retaining member 432 may be in contact with the light incident surface 300a of the light guide plate 300, and accordingly the gap-retaining member 432 may support or fix the light guide plate 300.

The gap-retaining member 432 is arranged between the plurality of light sources 420. Accordingly, the gap-retaining member 432 may not interfere with a path of the light emitted from the plurality of light sources 420.

The gap-retaining member 432 may be arranged to be adjacent to the light incident surface 300a of the light guide plate 300 rather than the light sources 420.

In addition, a contact surface 432a of the gap-retaining member 432 is arranged at a position higher than the position of the light sources 420 in a Z direction.

In case the light incident surface 300a of the light guide plate 300 moves towards the light source 420 by thermal expansion, its own weight or the expansion or the movement of the light guide plate 300 during the movement of the display device 1, the gap-retaining member 432 may prevent the light incident surface 300a of light guide plate 300 and the light source 420 from being close to each other by the predetermined optical distance D or less, by interfering the light incident surface 300a of the light guide plate 300.

Therefore, the gap-retaining member 432 may retain the predetermined optical distance D between the light incident surface 300a of the light guide plate 300 and the light source 420. In addition, it is possible to prevent occurrence of a phenomenon such as light leakage by preventing the contact between the light source 420 and the light guide plate 300.

The gap-retaining member 432 may include the contact surface 432a that comes into contact with the light incident surface 300a of the light guide plate 300. The contact surface 432a is formed to be parallel with the light incident surface 300a. Thus, the contact surface 432a of the gap-retaining member 432 may stably support the light guide plate 300 by coming into contact with the light incident surface 300a.

The gap-retaining member 432 may be formed by injection molding integrally with the connector main body 431. Thus, there is no need to provide additional processes for generating the gap-retaining member 432 separately and combining the gap-retaining member 432 with the connector main body 431, thereby reducing the production cost and time.

The gap-retaining member 432 may be composed of a transparent material, if necessary. Thus, the gap-retaining member 432 may not interfere a path of light emitted from the light source 420, although the gap-retaining member 432 is formed higher than the existing height in order to set the light guide plate 300 and the light source 420 to be further spaced apart by the optical distance D.

Figure 4:
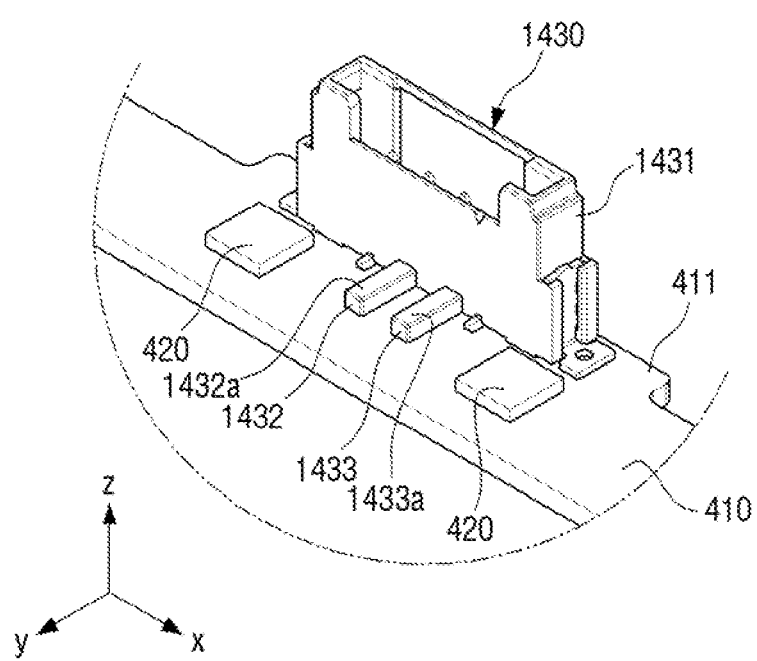
FIG. 4 is a view showing a modification example of the connector shown in FIG. 3.

FIG. 4 is view showing a modification example of the connector shown in FIG. 3.

The printed circuit board 410, the combination part 411, and the light source 420 shown in FIG. 4 are the same elements as shown in FIG. 3, and thus, the overlapped description will be omitted.

A connector 1430 includes a connector main body 1431 combined with the printed circuit board 410, and a plurality of gap-retaining members 1432 and 1433 arranged between the printed circuit board 410 and the light guide plate 300 so that the light source 420 and the light incident surface 300a of the light guide plate 300 are spaced apart by a predetermined optical distance.

The plurality of gap-retaining members 1432 and 1433 have the same shapes as each other and are formed to be protruded from the connector main body 1431 in parallel at regular intervals. The plurality of gap-retaining members 1432 and 1433 includes contact surfaces 1432a and 1433a coming into contact with the light incident surface 300a, respectively, and the contact surfaces 1432a and 1433a have the same heights as each other in the Z direction. Accordingly, the plurality of gap-retaining members 1432 and 1433 may stably support the light guide plate 300 without tilting it to one side. In addition, it is possible to further stably support or fix the light guide plate 300 with only single connector 1430, since the plurality of gap-retaining members 1432 and 1433 are formed on the single connector 1430.

Figure 5A:
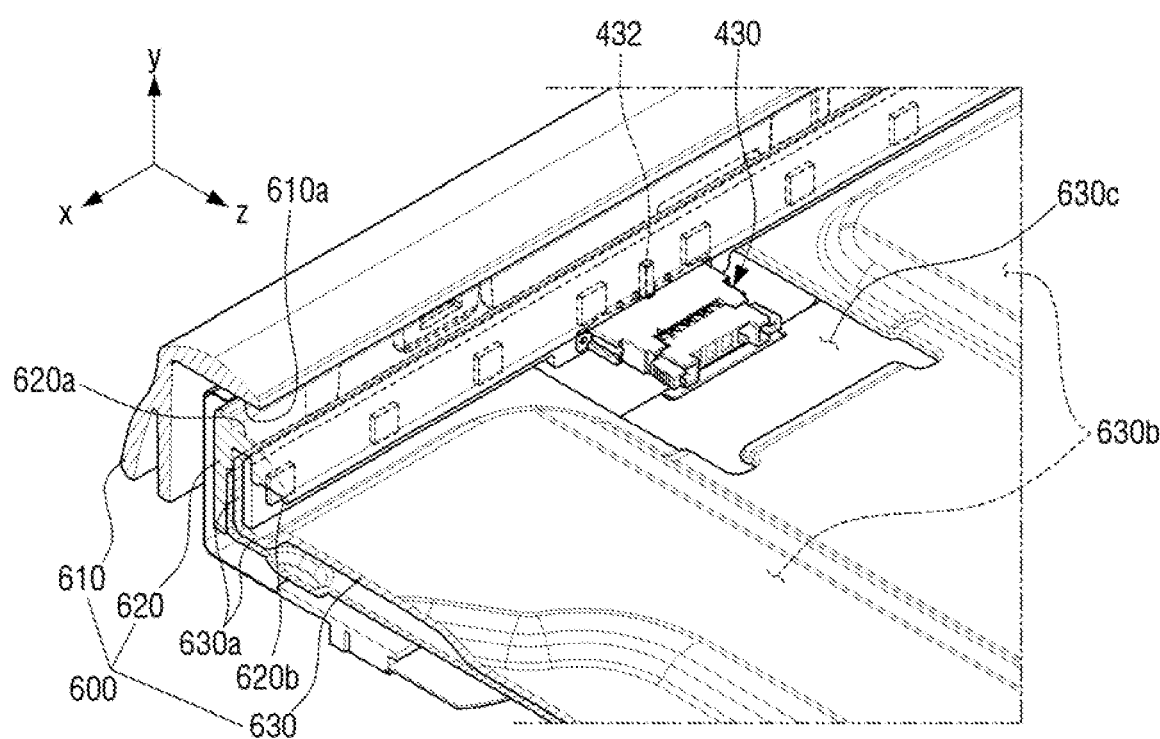
FIGS. 5A and 5B are cross-sectional perspective views of the display device shown in FIG. 1 taken along A-A.
Figure 5B:
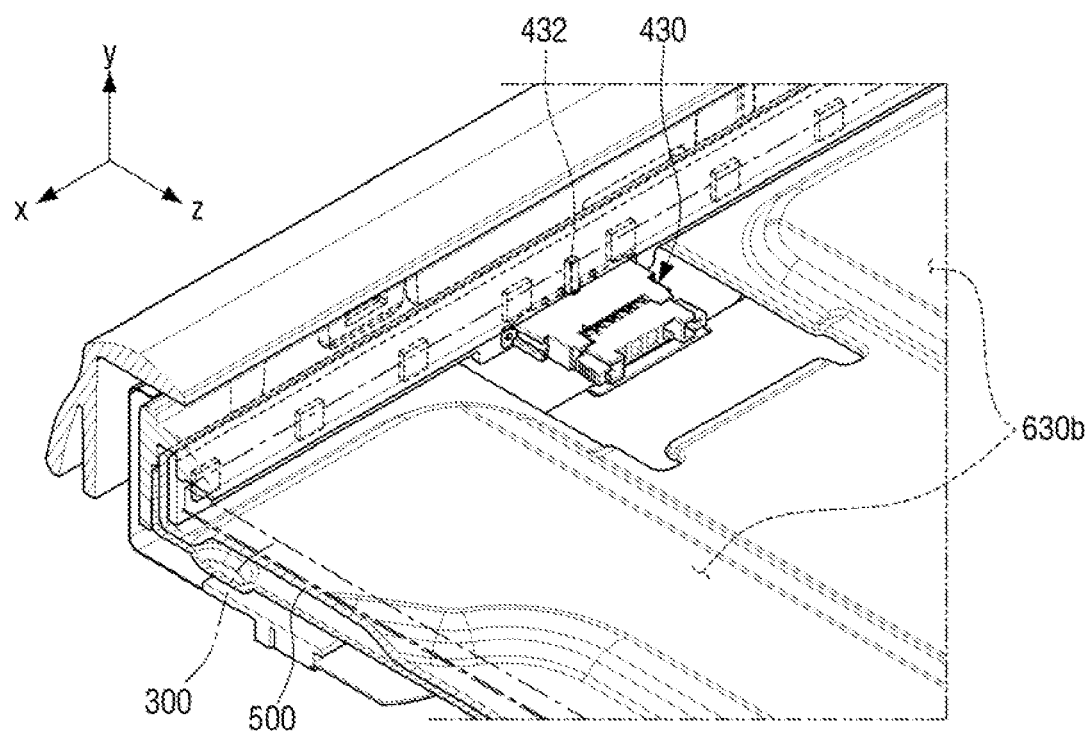

FIGS. 5A and 5B are cross-sectional perspective views of the display device 1 shown in FIG. 1 taken along A-A.

Hereinafter, a specific structure of the connector 430 and the holder 600 will be described with reference to FIGS. 5A and 5B.

In FIG. 5A, for convenience of description, the display panel 100, the light guide plate 300, and the reflective sheet 500 are omitted, and the light guide plate 300 and the reflective sheet 500 omitted in FIG. 5A are additionally shown in FIG. 5B.

Referring to FIG. 5A, the holder 600 includes a top chassis 610, a first holder 620, and a second holder 630.

The top chassis 610 has a fixing surface 610a that comes into contact with a front surface 101 (see FIG. 2) of the display panel 100 to fix and support the display panel 100, and the appearance of the display device 1 is formed.

In the first holder 620, a first support surface 620a of the first holder 620 comes into contact with a back surface (not shown) of the display panel 100 to fix and support the display panel 100.

In the first holder 620, a second surface 620a of the first holder 620 comes into contact with the front surface 301 (see FIG. 2) of the light guide plate 300 to support the light guide plate 300.

An accommodation part 630a for accommodating the printed circuit board 410 is formed on one surface of the second holder 630, and a plurality of third support surfaces 630b supporting the light guide plate 300 and the reflective sheet 500 are formed. An accommodation space 630c for arranging the connector 430 to be combined with the printed circuit board 410 is formed between the plurality of third support surfaces 630b.

The accommodation space 630c is composed of a groove having a uniform shape that is able to accommodate the connector 430 to be arranged at the back of the light guide plate 300. Accordingly, referring to FIG. 5B, even if the light guide plate 300 (shown with alternate long and short dash line) and the reflective sheet 500 (shown with alternate long and short dash line) are arranged on the third support surface 630b, the connector 430 and the light guide plate 300 do not interfere each other, and the connector 430 and the reflective sheet 500 do not interfere each other, either.

FIG. 6 is a front view showing the light guide plate 300 and the light source module 400 according to an embodiment of the disclosure.

Hereinafter, a structure according to an embodiment of the disclosure in which the light source module 400 supports the light guide plate 300 will be specifically described with reference to FIG. 6.

As shown in FIG. 6, the light incident surface 300a of the light guide plate 300 may be arranged on a lower surface of the light guide plate, and thus, the light source module 400 is arranged to face the light incident surface 300a corresponding to the lower surface of the light guide plate 300.

Specifically, the gap-retaining member 432 of the connector 430 may come into contact with the light incident surface 300a of the light guide plate 300, and the gap-retaining member 432 may support the light guide plate 300 applied by own weight.

Thus, the connector 430 may include the gap-retaining member 432 so that the connector 430 may transfer the power to the printed circuit board 410 and the light source 420, and the predetermined optical distance D between the light source 420 and the light guide plate 300 may be retained.

It is possible to stably support the light guide plate 300 without tilting it to one side, since the connector 431 and the gap-retaining member 432 included in the connector 431 are arranged at the center of the printed circuit board 410 in the length direction.

Figure 7:
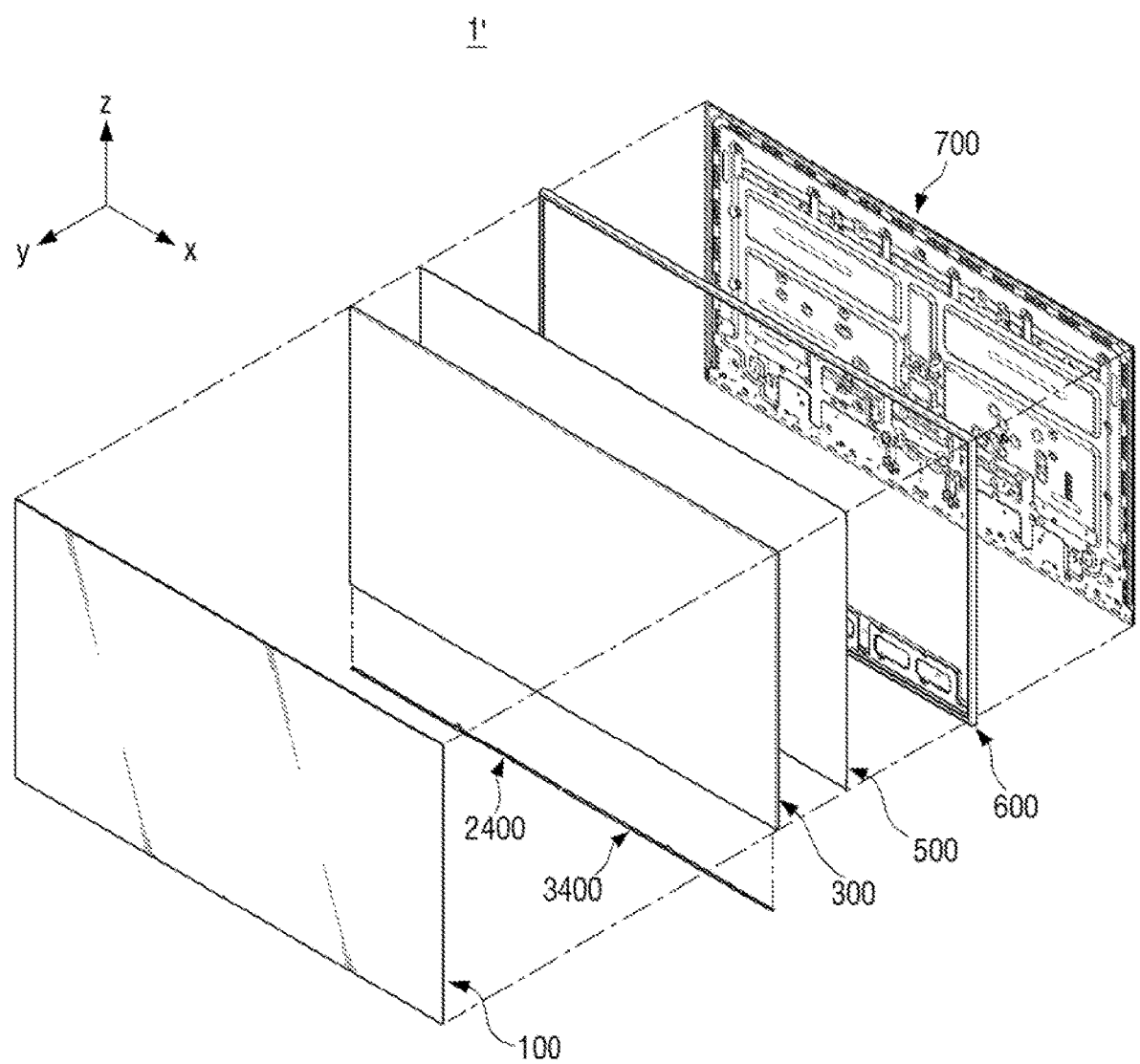
FIG. 7 is an exploded perspective view of a display device including a light source module according to a modification example.
Figure 8:
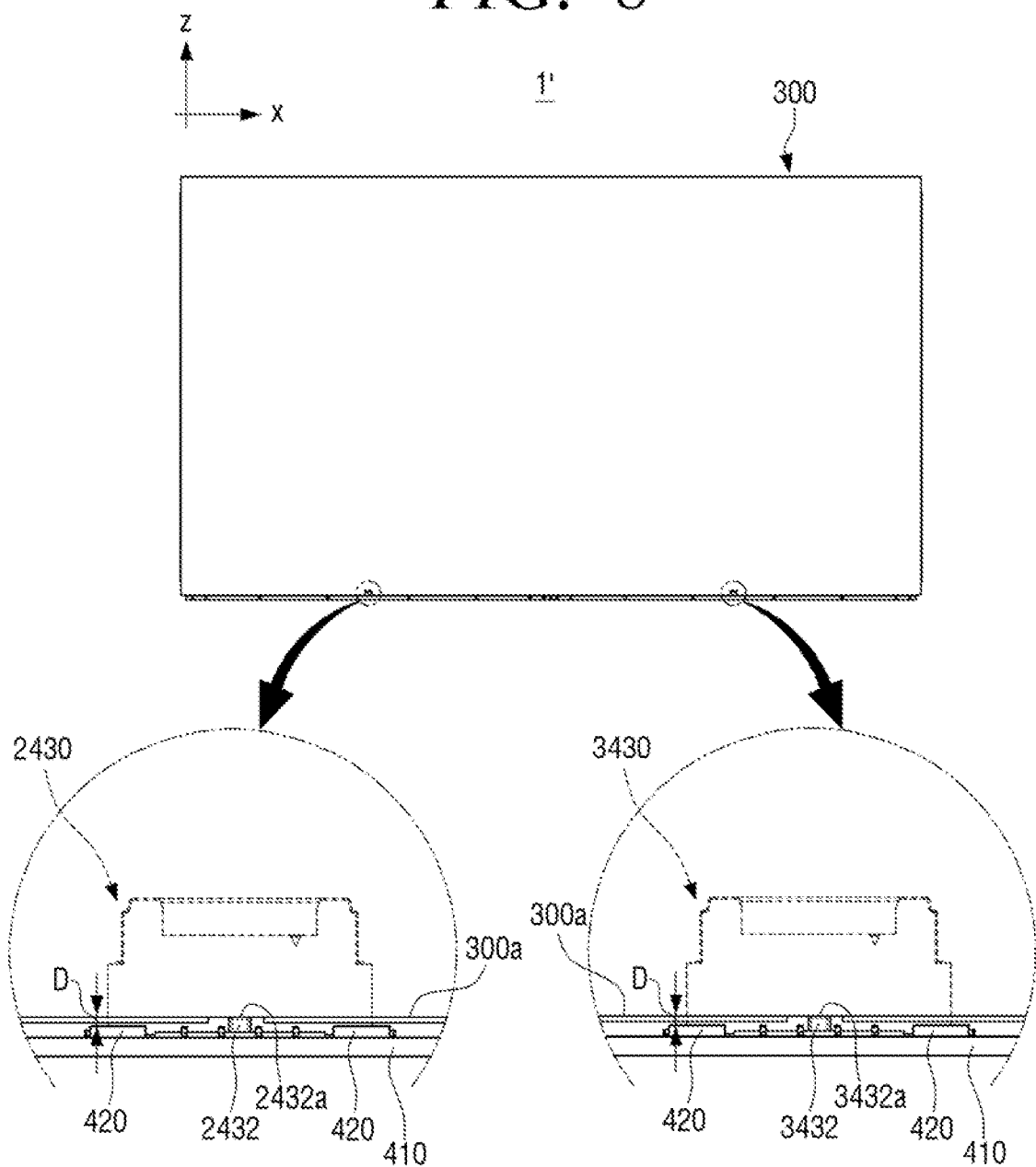
FIG. 8 is a front view showing the light guide plate and the light source module shown in FIG. 7.

FIG. 7 is an exploded perspective view of a display device 1' including light source modules 2400 and 3400 according to a modification example of the disclosure, and FIG. 8 is a front view showing the light guide plate 300 and the light source modules 2400 and 3400 shown in FIG. 7.

Hereinafter, structures of the light source modules 2400 and 3400 according to a modification example of the disclosure will be specifically described with reference to FIGS. 7 and 8.

The display panel 100, the light guide plate 300, the reflective sheet 500, the holder 600, and the bottom chassis 700 shown in FIG. 7 are the same elements as shown in FIG. 2, and thus, the overlapped description will be omitted.

Referring to FIG. 7, the light source module may be composed of a plurality of the light source modules of the display device 1, and includes the first light source module 2400 and the second light source module 3400 arranged along the length direction of the light incident surface 300a. The first light source module 2400 includes a first connector 2430 (see FIG. 8) and the second light source module 3400 includes a second connector 3430 (see FIG. 8). In addition, the first and second light source modules 2400 and 3400 may include first and second gap-retaining members 2432 and 3432 (see FIG. 8) supporting the light guide plate 300, respectively.

The first and second gap-retaining members 2432 and 3432 are the same elements as the gap-retaining member 432 according to an embodiment of the disclosure described above.

The first and second gap-retaining members 2432 and 3432 are formed to be protruded in parallel at regular intervals. The first and second gap-retaining members 2432 and 3432 include contact surfaces 2432a and 3432a coming into contact with the light incident surface 300a, respectively, and the contact surfaces 2432a and 3432a have the same heights as each other in the Z direction.

Accordingly, the first and second gap-retaining members 2432 and 3432 may stably support the light guide plate 300 without tilting it to one side, while retaining the predetermined optical distance D between the light source 420 and the light guide plate 300. In addition, the plurality of light source modules may be arranged according to the size of the display device 1' and the light guide plate 300 may be stably supported without tilting it to one side, at the same time.

Figure 9:
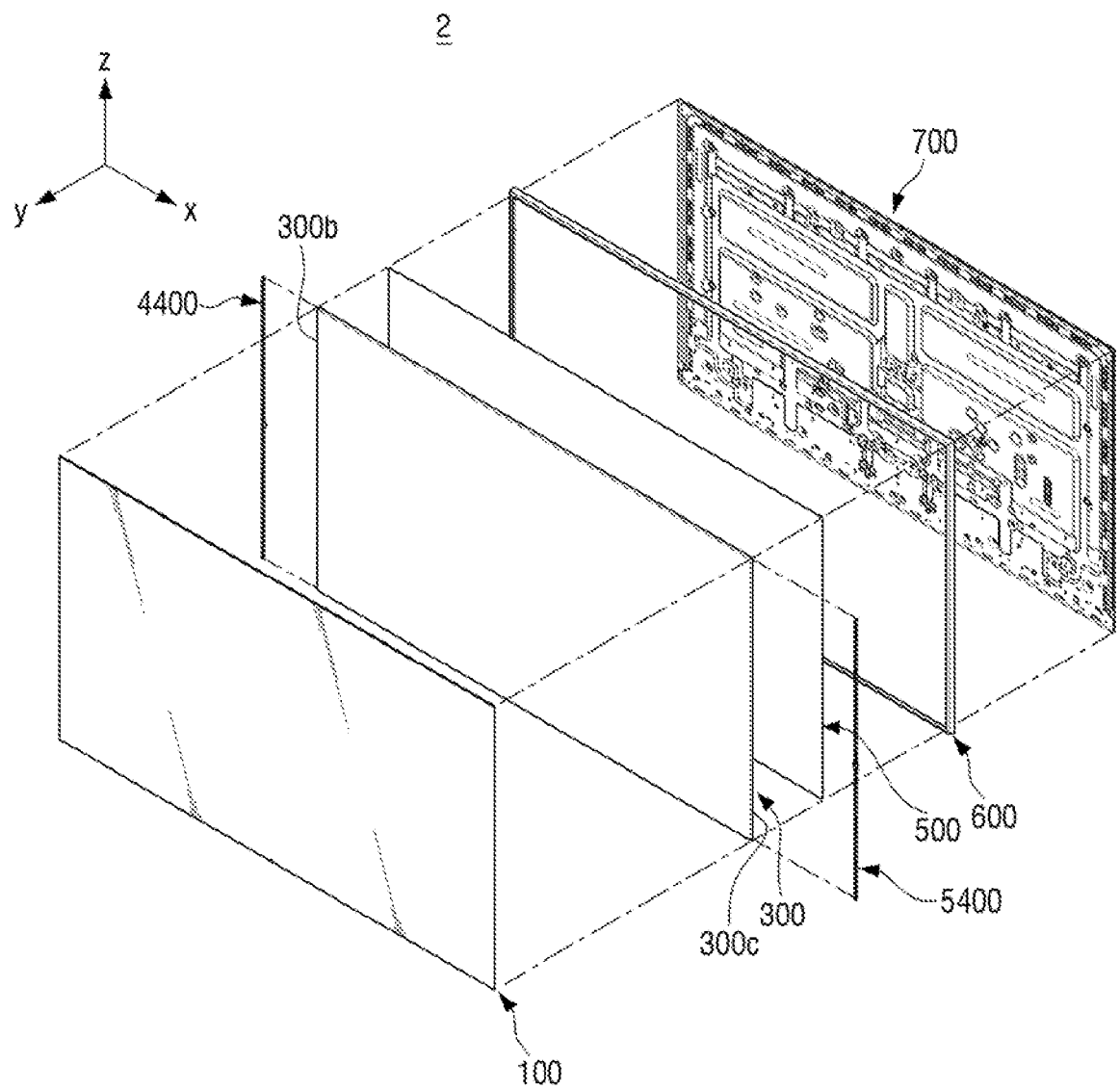
FIG. 9 is an exploded perspective view showing a display device according to another embodiment.
Figure 10:
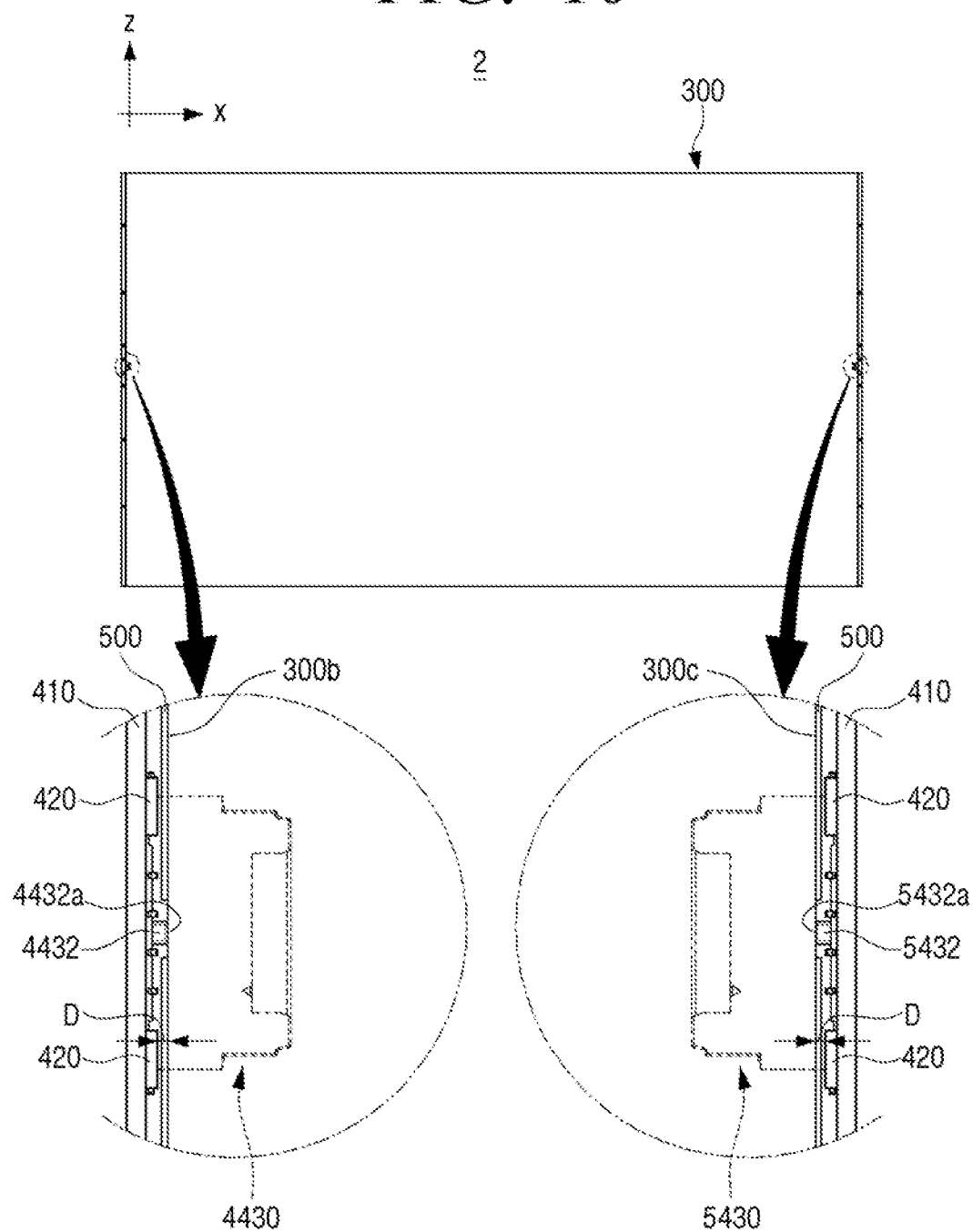
FIG. 10 is a front view showing the light guide plate and a light source module shown in FIG. 9.

FIG. 9 is an exploded perspective view showing a display device 2 according to another embodiment of the disclosure, and FIG. 10 is a front view showing the light guide plate 300 and light source modules 4400 and 5400 shown in FIG. 9.

Hereinafter, a structure according to another embodiment of the disclosure will be specifically described with reference to FIGS. 9 and 10.

The display panel 100, the light guide plate 300, the reflective sheet 500, the holder 600, and the bottom chassis 700 shown in FIG. 9 are the same elements as shown in FIG. 2, and thus, the overlapped description will be omitted.

The light guide plate 300 includes a first light incident surface 300b formed at one surface of the light guide plate 300 and a second light incident surface 300c arranged at another surface opposite to the one surface.

In addition, the light source module may be composed of a plurality of light source modules to correspond to the first and second light incident surfaces 300b and 300c, and the light source module includes a third light source module 4400 emitting light to the first light incident surface 300b and a fourth light source module 5400 emitting light to the second light incident surface 300c.

Accordingly, the amount of light emitted to the light guide plate 300 may increase and the amount of light of a screen displayed through the display panel 100 may increase.

The third light source module 4400 includes a third connector 4430 (see FIG. 10) and the fourth light source module 5400 includes a fourth connector 5430 (see FIG. 10). In addition, the third and fourth light source modules include third and fourth gap-retaining members 4432 and 5432 coming into contact with the light guide plate 300, respectively.

The third gap-retaining member 4432 includes a third contact surface 4432a coming into contact with the first light incident surface 300b, and the fourth gap-retaining member 5432 includes a fourth contact surface 5432a coming into contact with the second light incident surface 300c.

The third and fourth gap-retaining members 4432 and 5432 are the same elements as the gap-retaining member 432 according to an embodiment of the disclosure described above.

The first light incident surface 300b and the second light incident surface 300c may correspond to both surfaces of the light guide plate 300. In addition, the third and fourth gap-retaining members 4432 and 5432 may be arranged symmetrically to each other with respect to the light guide plate 300.

Accordingly, even if the light guide plate 300 are thermally expanded due to the light source 420, the third and fourth gap-retaining members 4432 and 5432 may constantly retain the optical distance D between the light source 420 and the light guide plate 300. In addition, the third and fourth gap-retaining members 4432 and 5432 may stably fix the light guide plate 300 not to move in both directions.

In the display devices 1, 1', and 2 of the disclosure described above, the light guide plate 300 may be supported or fixed while retaining the predetermined optical distance D between the light guide plate 300 and the light source 420 by the connectors 430, 1430, 2430, 3430, 4430, and 5430 including the gap-retaining members 432, 1432, 2432, 3432, 4432, and 5432 arranged between the light guide plate 300 and the printed circuit board 410. Thus, it is possible to solve the problem regarding occurrence of a phenomenon such as light leakage by constantly retaining a gap between the light guide plate 300 and the light source 420.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. A backlight unit comprising:
a light guide plate; and
a light source module configured to emit light to a light incident surface formed on at least one surface of the light guide plate,
wherein the light source module comprises:
a printed circuit board;
a plurality of light sources arranged on the printed circuit board; and
a connector comprising a connector main body forming a cable insertion hole and connected to the printed circuit board to transfer electric power,
wherein the connector further comprises a gap-retaining member arranged between the printed circuit board and the light guide plate so that at least one light source of the plurality of light sources and the light incident surface are spaced apart from each other by a predetermined optical distance,
wherein the gap-retaining member is protruded from one surface of the connector main body, and
wherein the connector main body is arranged at the back of the light guide plate.

2. The backlight unit according to claim 1, wherein the gap-retaining member is arranged to be closer to the light incident surface rather than the at least one light source of the plurality of light sources.

3. The backlight unit according to claim 2, wherein the gap-retaining member comes into contact with the light incident surface.

4. The backlight unit according to claim 2, wherein the plurality of light sources are arranged along a length direction of the printed circuit board, and
wherein the gap-retaining member is arranged between the plurality of light sources.

5. The backlight unit according to claim 2, wherein the connector main body is combined with the printed circuit board.

6. The backlight unit according to claim 5, wherein the gap-retaining member is protruded from the one surface of the connector main body between the printed circuit board and the light incident surface.

7. The backlight unit according to claim 6, wherein the printed circuit board is arranged to face the light incident surface.

8. The backlight unit according to claim 7, wherein the printed circuit board comprises a combination part that is protruded towards the back of the light guide plate and combined with the connector main body.

9. The backlight unit according to claim 5, wherein the connector main body is arranged at the center of the printed circuit board in a length direction.

10. The backlight unit according to claim 1, wherein the connector comprises a plurality of the gap-retaining members.

11. The backlight unit according to claim 5, wherein the connector main body and the gap-retaining member are integrally formed by injection molding.

12. The backlight unit according to claim 3, wherein the light incident surface is arranged at a lower surface of the light guide plate, and
wherein the gap-retaining member supports the light guide plate.

13. The backlight unit according to claim 12, wherein the light source module comprises a plurality of light source modules, the plurality of light source modules comprising a first light source module and a second light source module arranged along a length direction of the light incident surface, and
wherein the first and the second light source modules respectively comprise a first gap-retaining member and a second gap-retaining member, the first and the second gap-retaining members supporting the light guide plate.

14. The backlight unit according to claim 1, wherein the light guide plate comprises a first light incident surface formed on one surface of the light guide plate and a second light incident surface arranged on the other surface opposite to the one surface,
wherein the light source module comprises a plurality of light source modules, the plurality of light source modules comprising a third light source module emitting light to the first incident surface and a fourth light source modules emitting light to the second light incident surface, and
wherein the third and fourth light source modules respectively comprise a third gap-retaining member and a fourth gap-retaining member in contact with the light guide plate.

15. A display device comprising:
a display panel; and
a backlight unit providing light to the display panel,
wherein the backlight unit comprises:
a light guide plate; and
a light source module configured to emit light to a light incident surface formed on at least one surface of the light guide plate,
wherein the light source module comprises:

a printed circuit board;
a plurality of light sources arranged on the printed circuit board; and
a connector comprising a connector main body forming a cable insertion hole and connected to the printed circuit board to transfer electric power,
wherein the connector further comprises a gap-retaining member arranged between the printed circuit board and the light guide plate so that at least on light source of the plurality of light sources and the light incident surface are spaced apart from each other by a predetermined optical distance,
wherein the gap-retaining member is protruded from one surface of the connector main body, and
wherein the connector main body is arranged at the back of the light guide plate.

\* \* \* \* \*